United States Patent [19]

Rukavina et al.

[11] 4,434,284

[45] Feb. 28, 1984

[54] POLYURETHANE FORMULATION FOR LARGE SCALE CASTING

[75] Inventors: Thomas G. Rukavina, Lower Burrell; Charles R. Coleman, Pittsburgh, both of Pa.

[73] Assignee: PPG Industries, Inc., Pittsburgh, Pa.

[21] Appl. No.: 376,490

[22] Filed: May 10, 1982

[51] Int. Cl.³ .................... C08G 18/24; C08G 18/06
[52] U.S. Cl. ........................ 528/58; 528/48; 528/67; 528/77; 528/83; 528/85
[58] Field of Search ............... 528/85, 67, 58, 48, 528/77, 83

[56] References Cited

U.S. PATENT DOCUMENTS 4,101,529 7/1978 Ammons .................. 528/67

Primary Examiner—Dolph H. Torrence
Attorney, Agent, or Firm—Donna L. Seidel

[57] ABSTRACT

A method for improving the pot life of polyurethane reaction mixtures by solubilizing the polyol component in the isocyanate to lower the required mixing temperature is disclosed.

7 Claims, No Drawings

POLYURETHANE FORMULATION FOR LARGE SCALE CASTING

BACKGROUND OF THE INVENTION

1. Field of the Invention

The present invention relates generally to the art of making polyurethanes, and more particularly to the art of making polyurethane compositions suitable for fabrication by casting and curing in place.

2. Discussion of the Technology

U.S. Pat. No. 4,101,529 to Ammons discloses polyurethane compositions prepared from a cyclic aliphatic polyisocyanate a low molecular weight, active hydrogen-containing material and a polycarbonate diol which may be cast and cured in place to make articles in sheet form. The polyurethanes are prepared by mixing the polyisocyanate and the active hydrogen-containing materials together in a nitrogen atmosphere at temperatures between about 45° and 90° C. (about 113° to 194° F.). It is disclosed that where a catalyst is employed, a pot life extender such as stearyl acid phosphate should be used to facilitate casting the reaction mixture into a mold.

However, in some instances, such as casting the reaction mixture in contact with a polycarbonate surface, these reaction mixtures are unsuitable because the cure rate is too slow, allowing the isocyanate component to attack the polycarbonate surface.

SUMMARY OF THE INVENTION

The present invention provides a polyurethane reaction mixture with sufficiently fast curing in addition to sufficiently long pot life for large scale casting. The polyurethane compositions of the present invention achieve a relatively long pot life as a result of low temperature mixing of the reactants. While the prior art teaches heating the isocyanate reactant to a temperature of about 180° to 190° F. (about 82° to 88° C.) and adding the polyol reactants at similar temperatures, the present invention involves adding the isocyanate reactant to a polyol component which is heated only enough to maintain it in a liquid phase, typically less than about 104° F. (40° C.). When these two components are thoroughly degassed, the temperature can be further lowered to about 60° to 65° F. (about 15° to 18° C.), at which temperature the catalyst may be added. At these temperatures the pot life of the reaction mixture containing the catalyst is substantially longer than the pot life of a catalyzed reaction mixture at previously typical processing temperatures of 180° to 190° F. (about 82° to 88° C.).

DESCRIPTION OF THE PREFERRED EMBODIMENTS

Polyurethane compositions which have an extended pot life in accordance with the present invention may be broadly defined as consisting essentially of an organic polyisocyanate and an organic compound having at least two hydrogens capable of reacting with the isocyanate to form polyurethane linkages. Preferably, the composition further comprises a cross-linking agent, typically an organic compound having at least three hydrogens capable of reacting with the isocyanate.

The organic polyisocyanate component should preferably be an organic diisocyanate. Cyclic aliphatic diisocyanates are preferred since they are not adversely affected by ultraviolet light and have high impact energy absorption levels. In addition, polyurethanes prepared with cyclic aliphatic diisocyanates are not adversely affected by conventional processing temperatures. A preferred cyclic aliphatic diisocyanate is 4,4'-methylene-bis(cyclohexyl isocyanate). Other dinuclear cyclic aliphatic diisocyanates which are preferred are those formed through an alkylene group of from 1 to 3 carbon atoms which can be substituted with groups that are not reactive with hydroxyl or isocyanate groups, provided the substituents are not positioned so as to render the isocyanate group unreactive. Another preferred dinuclear cycloaliphatic diisocyanate is 4,4'-isopropylidene-bis-(cyclohexyl isocyanate). An example of a preferred mononuclear cyclic aliphatic diisocyanate is 1,4-cyclohexyl diisocyanate. Hydrogenated aromatic diisocyanates such as hydrogenated toluene diisocyanate, as well as dinuclear diisocyanates in which one of the rings is saturated and the other unsaturated, can also be employed. Mixtures of cyclic aliphatic diisocyanates with straight chain aliphatic diisocyanates and/or aromatic diisocyanates can also be employed. Thioisocyanates corresponding to the above diisocyanates can be employed, as well as mixed compounds containing both an isocyanate and a thioisocyanate group.

Straight chain aliphatic diisocyanates such as 1,4-tetramethylene diisocyanate, 1,6-hexamethylene diisocyanate, 1,10-decamethylene diisocyanate, and hexamethylene adipamide diisocyanate can also be employed. Suitable aromatic diisocyanates, although not preferred, can be employed in some instances, and include mononuclear types such as 2,4-toluene diisocyanate, 2,6-toluene diisocyanate, metaphenylene diisocyanate; dinuclear aromatic diisocyanates such as 4,4'-diphenylene diisocyanate and 1,5-naphthalene diisocyanate; halogenated substituted aromatic diisocyanates such as 4-chloro-1-3-phenylene diisocyanate; alkyl substituted diisocyanates such as 3,3'-dimethyl 4,4'-diphenylene diisocyanate; xylene diisocyanates including 1,3-xylene diisocyanate and 1,4-xylene diisocyanate; durene isocyanates such as 2,3,5,6-tetramethyl-1,4-diisocyanate; aromatic-cycloaliphatic diisocyanates such as 1,5-tetrahydronaphthalene diisocyanate; polynuclear aromatic diisocyanates bridging through aliphatic groups such as diphenyl methane diisocyanate and diphenyl isopropylidene diisocyanate; alkoxy substituted aromatic diisocyanates such as dianisidine diisocyanates; mononuclear aralkyl diisocyanates such as xylene diisocyanates; aliphatic branched chain diisocyanates such as 2,2,4-trimethylhexamethylene diisocyanate; and ester-containing aliphatic diisocyanates such as 2,6-diisocyanato methyl caproate (Lysine diisocyanate). In addition, sterically hindered compounds wherein the isocyanate groups differ in reactivity such as 2,4-diethylmethylene-bis-(4-phenylene isocyanate); 3-isocyanato methyl-3,5,5'-trimethylcyclohexyl diisocyanate and 2,6-diethyl-1,4-phenylene diisocyanate may also be employed. In addition, diisocyanates bonded from sulfonyl groups such as 1,3-phenylene disulfonyl diisocyanate and 1,4-xylene disulfonly diisocyanate may be used.

The polyisocyanates as described above are reacted with at least one compound contaning at least two groups which are reactive with the isocyanate group. The preferred compounds are those which have at least two, preferably only two, active hydrogens per molecule, such as polyols and polyamines, preferably diols. Suitable polyols include long chain diols such as polyester diols, polycarbonate diols and polyether diols, as well as monomeric aliphatic diols.

Preferred polyester diols can be prepared by the polyesterification reaction of an aliphatic dibasic acid or an anhydride thereof with a diol, preferably an aliphatic diol. Suitable aliphatic dicarboxylic acids can be represented by the formula HOOC-R-COOH wherein R is an alkylene radical containing from 2 to 12, and preferably from 4 to 8, carbon atoms, examples of which are adipic, succinic, glutaric, palmitic, suberic, azelaic and sebacic radicals. Suitable saturated or unsaturated aliphatic diols contain from about 4 to about 15 carbon atoms. A preferred example is 1,4-butanediol. The number average molecular weight of the polyester diol prepared from aliphatic diols and carboxylic acids is preferably between about 300 and about 5000, preferably about 400 to 2000.

Polyester diols can also be made from the polymerization of lactone monomers. Polyester polyols from caprolactone can be prepared by subjecting a lactone represented by the formula:

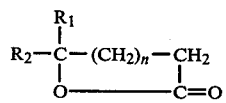

wherein $R_1$ and $R_2$ are each hydrogen or an alkyl of 1 to 10 carbon atoms, and n is an integer from 1 to 3, to polymerization in the presence of water or minor amounts of a low molecular weight glycol such as ethylene glycol, diethylene glycol, triethylene glycol, 1,4-butanediol, propylene glycol, 1,6-hexanediol, etc. or a triol such as trimethylolpropane. The ring opening in polymerization is generally effected at a temperature between about 50° C. and 300° C., and preferably in the presence of a catalyst. Preparation of polycaprolactones is well known in the polyester art. Suitable caprolactones include epsilon-caprolactones; monoalkyl, for example, methyl and ethyl-epsilon-caprolactones, dialkyl, for example dimethyl and diethyl epsilon-caprolactones, cyclohexylepsilon-caprolactones, etc. The preferred lactone is epsilon-caprolactone. The number average molecular weight of polyesters prepared from polycaprolactone diols should be about 500 to 5000, preferably about 500 to 2000; for polyester prepared from polycaprolactone triols, the molecular weight should be about 300 to 5000, preferably about 300 to 2000.

The above described polyesters can be represented by the following formulae:

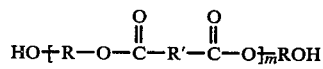

wherein R is the alkylene portion of the glycol used to prepare the polyester, R' is the alkylene portion of the dicarboxylic acid, and m is a number that ranges to about 15 or more;

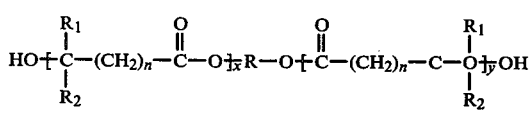

which represents polycaprolactones, wherein n is preferably 4, $R_1$ and $R_2$ are each hydrogen or $C_1$ to $C_{10}$ alkyl, preferably $C_1$-$C_4$ alkyl, R is the alkylene portion of the glycol used to ring open the lactone and x plus y is a number that ranges up to 30 or more, but x and y are not simultaneously O; and

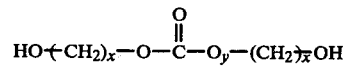

which represents polyalkylene carbonate diols such as poly(1,6-hexylenecarbonate) diol. The preparation of the poly(alkylenecarbonate) diols can be carried out by reacting an aliphatic diol with phosgene; with a chloroformic acid ester; with a diaryl carbonate such as diphenyl carbonate, ditolyl carbonate, or dinaphthyl carbonate; or with a di-lower alkyl carbonate such as dimethyl, diethyl, or di-n-butyl carbonate, either by heating the reactants alone or in the presence of an ester interchange catalyst depending on the reactants chosen. Preferably, polyalkylene carbonate diols are prepared using tetrabutyl titanate catalyst as described in U.S. Pat. No. 4,160,853 to Ammons. Polycarbonates of different higher molecular weights are obtained depending on the proportions of reactants used. When carbonate ester reagents are used, a calculated quantity of the by-product monohydroxy compound is removed by distillation. Suitable alkylene diols include linear aliphatic diols having from about 4 to 10 carbon atoms such as 1,4-butanediol, 1,6-hexanediol and 1,10-decanediol, with 1,6-hexanediol being preferred. Poly(alkylenecarbonate) diols having number average molecular weights from 300 to 5000 are suitable, with a 300 to 2000 molecular weight range being preferred.

In synthesizing the polyurethanes, chain extension can be accomplished with a compound having two active hydrogens per molecule. The resulting polyurethanes have thermoplastic properties. Preferred chain extenders are aliphatic diols having a molecular weight below 250, and about 6 to 15 carbon atoms. Preferred chain extenders include 1,6-hexanediol with polycarbonate diols, and cyclohexanedimethanol with polycaprolactone and other polyester diols.

The polyurethane can be cured with a compound having more than two active hydrogens per molecule. The resulting polyurethanes have thermosetting properties. Representative curing agents are polyols having at least three hydroxyl groups, such as trimethylolpropane, trimethylolheptane, pentaerythritol and castor oil. Also suitable are mixed curing agents such as polyols having three hydroxyl groups in conjunction with a low molecular weight diol.

For optimum results, the water content of the hydroxyl-terminated reactants should be as low as possible, and the isocyanate reaction should generally be conducted under anhydrous conditions with dry reactants, such as in a nitrogen atmosphere at atmospheric pressure. The reaction is conducted until there are essentially no free isocyanate or hydroxyl groups, (i.e. less than about 0.6 percent and preferably less than 0.3 percent by weight NCO). The ratio of reactants may vary depending upon the materials employed and the intended use of the urethane, but preferably the total number of active hydrogen atoms is approximately equivalent to the number of isocyanate groups. The NCO to active hydrogen ratio is generally from between about 0.9 to about 1.1, preferably between about 0.97 and about 1.03.

The polyurethane reaction is carried out in the presence of a catalyst. Catalysts have been found to give shorter cure times at lower temperatures and to insure complete reaction resulting in a cured polymer being essentially free of unreacted NCO groups. Suitable urethane-forming catalysts are those that are specific for the formation of the urethane structure by the reaction of the NCO group of the diisocyanate with the active hydrogen-containing compound and which have little tendency to induce side reactions. For these reasons, catalysts such as stannous salts of organic acids and organotin compounds are preferred. Preferred catalysts include stannous octoate, stannous oleate, dibutyltin diacetate, butyl stannoic acid and dibutyltin dilaurate. The amount of catalyst used in any particular reaction mixture may be determined empirically and will be determined by the desired curing time and temperature. In general, amounts of from about 5 to 1000 parts per weight of catalyst per million parts of polyurethane-forming ingredients are useful.

The polyurethane compositions of the present invention are formulated by mixing all components simultaneously in a so-called "one-step" or bulk polymerization process. This method is generally satisfactory when all active hydrogen compounds react at about the same rate. However, when the active hydrogens react at different rates, such as when the long chain diol and curing agent are of greatly different molecular weights, e.g. poly(1,4-butylene adipate) diol which has a molecular weight of 2500 and cyclohexanedimethanol which has a molecular weight of 144, a catalyst is added to catalyze the reaction so that the higher molecular weight compound reacts about equally. Particularly useful catalysts are the tin catalysts mentioned above such as dibutyltin dilaurate, stannous octoate, and butyl stannoic acid.

It has been customary to dissolve the catalyst in a liquid active hydrogen component, such as a polyol, prior to combining the polyol with the isocyanate component to form the reaction mixture to be cast. It has generally been necessary to heat the polyol above its melting point, dissolve the catalyst in the polyol and blend the catalyst in heated polyol with the isocyanate component, which must be maintained at a sufficiently high temperature to prevent the polyol from freezing out of the reaction mixture. At such temperatures the pot life of the reaction mixture is relatively short, typically less than 30 minutes. Therefore, reaction mixtures were kept small in volume, and the number of sheets which could be cast from a reaction mixture before the polymerization reaction had progressed too far to permit casting was small.

In accordance with the present invention, the pot life of the reaction mixture is increased and large scale casting is made possible by solubilizing the higher melting polyol component in the isocyanate component at temperatures as low as about 60° F. (about 15° C.). The catalyst dissolved in the lower melting polyol is then added to the isocyanate/polyol solution at ambient temperatures, or as low as about 60° F. (about 15° C.). At this temperature, the pot life of a typical reaction mixture is several times longer than the pot life of the same reaction mixture at the higher temperatures previously necessary. Since the reaction mixture is readily castable for a period of several hours, larger scale casting operations are possible.

Casting may be accomplished by merely pouring the resin into a cell, but preferably casting is accomplished by pumping a metered quantity of liquid resin into an interlayer space. After the resinous interlayer has been cast, the cell is sealed and the resin is permitted to cure in place. The temperature of cure will be from about 230° to 290° F. (about 110° to 143° C.) for a time less than 8 hours, typically about 1½ to 2½ hours. The curing times and temperatures are equivalent to the curing times and temperatures of a polyurethane composition without an organic phosphorus acid compound additive, while providing long pot life.

The present invention will be further understood from the description of a specific example which follows.

EXAMPLE I

Polyurethane reaction mixtures are prepared from the following components:

| Component | Melting Point (°C.) | Parts by Weight |
|---|---|---|
| Polycaprolactone diol | 65 | 43.3 |
| Trimethylolpropane | 56–58 | 2.34 |
| 4,4'-methylene-bis-(cyclohexyl isocyanate) | — | 40.5 |
| Cyclohexanedimethanol (includes 0.8% butyl stannoic acid) | 38 | 9.56 |

The method for preparing the reaction mixture, prior to the present invention, involved melting and mixing the polyol components, including the catalyst, and finally adding the isocyanate component. The resultant reaction mixture had a pot life (the time available for casting before the viscosity becomes prohibitively high) of about 10 to 20 minutes.

In accordance with the present invention, the higher melting polyol components are melted and mixed at a temperature of about 70° C. without catalyst and cooled to about 45° C. before adding the isocyanate component at the same temperature. At this temperature, the polyol components blend readily with the isocyanate without rapid reaction since the catalyst is not present. The mixture can be further cooled to about 30° to 35° C. without freezing out any of the solubilized polyol components. Adding the catalyst component at this temperature provides a pot life of about 2½ hours, which is sufficient for large scale casting. The reaction mixture can be cast against a polycarbonate surface and cured sufficiently fast to avoid attack of the polycarbonate surface by the isocyanate.

The above example is offered to illustrate the present invention, the scope of which is defined by the following claims.

We claim:

1. In a method of reacting an isocyanate compound with a compound containing active hydrogen capable of reacting with the isocyanate in the presence of a catalyst to form a polyurethane, wherein the catalyst is dissolved in the active hydrogen compound at a sufficient temperature to maintain the compound in a liquid phase, which compound is then mixed into the isocyanate at a sufficient temperature to prevent the compound from freezing out of solution, the improvement which comprises mixing the isocyanate into the active hydrogen compound in the absence of the catalyst at a sufficient temperature to maintain a homogeneous single-phase reaction solution, cooling the solution to a minimum temperature above the temperature at which the active hydrogen compound freezes out of the solution, which temperature is below the normal freezing point of the catalyst, and finally adding the catalyst.

2. An improved method according to claim 1, wherein the active hydrogen compound is a polyol.

3. An improved method according to claim 2, wherein the polyol is a polycarbonate diol.

4. An improved method according to claim 3, wherein the catalyst is butyl stannoic acid.

5. An improved method according to claim 4, wherein the isocyanate is 4,4'-methylene-bis(cyclohexyl isocyanate).

6. An improved method according to claim 5, wherein the isocyanate and polyol are mixed together at a temperature of about 45° C. to form a homogeneous solution which is then cooled to a temperature below about 35° C. prior to adding the catalyst.

7. An improved method according to claim 6, wherein the temperature to which the solution is cooled is about 15° to 20° C.

* * * * *